(12) United States Patent
Khdary et al.

(10) Patent No.: US 9,233,342 B2
(45) Date of Patent: Jan. 12, 2016

(54) ORGANIC-INORGANIC POROUS MEMBRANE AND A METHOD FOR PREPARING THE SAME

(71) Applicant: King Abdul Aziz City for Science and Technology (KACST), Riyadh (SA)

(72) Inventors: Nezar Hassan Mohamed Khdary, Riyadh (SA); Mamdouh Abdelsalam, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 238 days.

(21) Appl. No.: 14/079,472

(22) Filed: Nov. 13, 2013

(65) Prior Publication Data

US 2015/0129489 A1 May 14, 2015

(51) Int. Cl.
| | |
|---|---|
| B01D 39/00 | (2006.01) |
| B01D 39/14 | (2006.01) |
| B01D 67/00 | (2006.01) |
| B01D 29/46 | (2006.01) |
| B01D 69/00 | (2006.01) |
| B01D 69/14 | (2006.01) |
| B01D 71/70 | (2006.01) |

(52) U.S. Cl.
CPC ............. *B01D 69/148* (2013.01); *B01D 71/70* (2013.01)

(58) Field of Classification Search
CPC ...... B01D 71/56; B01D 69/148; B01D 71/68; B01D 71/26; B01D 71/12; B01D 71/64; B01D 67/0016; B01D 71/16; B01D 69/10; B01D 71/70; B01D 67/148
See application file for complete search history.

(56) References Cited

U.S. PATENT DOCUMENTS

| | | | | |
|---|---|---|---|---|
| 4,735,193 A | * | 4/1988 | Kulprathipanja | B01D 61/025 127/46.3 |
| 5,342,431 A | * | 8/1994 | Anderson | B01D 67/0041 95/45 |
| 7,247,238 B2 | * | 7/2007 | Mullette | B01D 67/0018 210/490 |
| 8,025,963 B2 | * | 9/2011 | Abdelsalam | B01D 39/2027 210/348 |
| 9,004,293 B2 | * | 4/2015 | Son | B01D 67/0079 210/500.21 |
| 2003/0089228 A1 | * | 5/2003 | Kulprathipanja | B01D 53/228 95/45 |
| 2010/0152042 A1 | * | 6/2010 | Do | B01J 20/08 502/407 |
| 2011/0104052 A1 | * | 5/2011 | Barnett | A61K 9/0019 424/1.21 |
| 2013/0203589 A1 | * | 8/2013 | Thompson | B01J 20/283 502/413 |
| 2015/0151984 A1 | * | 6/2015 | Han | B01D 69/02 210/490 |

OTHER PUBLICATIONS

Zhang et al, "Gas permeability properties of Matrimid(r) membranes conatining metal-organic framework Cu-BPY-HFS", Journal of Membrane Science 313 (2008) 170-181.*

* cited by examiner

*Primary Examiner* — Ana Fortuna
(74) *Attorney, Agent, or Firm* — Timberline Patent Law Group PLLC

(57) ABSTRACT

The invention provides an organic-inorganic porous membrane which includes metal organic silica nano-particles impregnated in a polymer. The polymer includes a property of generating porous membrane using a phase inversion technique. The invention also provides a method for preparing the organic-inorganic porous membrane.

24 Claims, 7 Drawing Sheets

ORGANIC-INORGANIC POROUS MEMBRANE AND A METHOD FOR PREPARING THE SAME

FIELD OF THE INVENTION

The invention generally relates to an organic-inorganic porous membrane and a method for manufacturing the organic-inorganic porous membrane. More specifically, the invention relates to an organic-inorganic porous membrane manufactured using metal organic silica nano-particles and a polymer. The organic-inorganic porous membrane is used for gas separation and water purification.

BACKGROUND OF THE INVENTION

Different types of membranes are used for gas separation and water purification. Porous and non-porous membranes are widely used for gas separation and water purification. A membrane is largely determined by membrane transport properties. The membrane transport properties include permeability of the membrane and selectivity for a specific molecule in a mixture.

The porous membranes are rigid, high voided with randomly distributed pores. The porous membranes which are used for separation are specifically designed to preferentially separate molecules in a mixture. For example, porous membranes with pore diameter smaller than the mean free path of a gas molecule are designed. The separation of gas using the porous membranes is based on pore size and pore distribution. The gas molecules can be separated using porous membrane only if sizes of gas molecules differ considerably in a gas mixture. Further, the porous membranes exhibit high level of flux but inherit low selectivity values. Thus, the porous membranes have high permeability but low selectivity properties.

The non-porous membranes are designed to adsorb specific molecules from a mixture on to the solid surface of the non-porous membranes. For example, a non-porous membrane prepared using mineral zeolite specifically adsorbs carbon dioxide ($CO_2$) from a gas stream. Thus, the porous membranes have high selectivity but low permeability properties.

When permeability of a membrane increases, selectivity decreases and when the selectivity increases, the permeability decreases. Therefore, there is a need to develop an improved membrane for gas separation and water purification.

BRIEF DESCRIPTION OF THE FIGURES

The accompanying figure together with the detailed description below forms part of the specification and serves to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily for an organic-inorganic porous membrane and in method steps related to manufacturing the organic-inorganic porous membrane.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides an organic-inorganic porous membrane and a method for manufacturing the organic-inorganic porous membrane. The organic-inorganic porous membrane is manufactured using metal organic silica nano-particles and a polymer which includes a property of generating porous membrane using a phase inversion technique.

Figure 1:
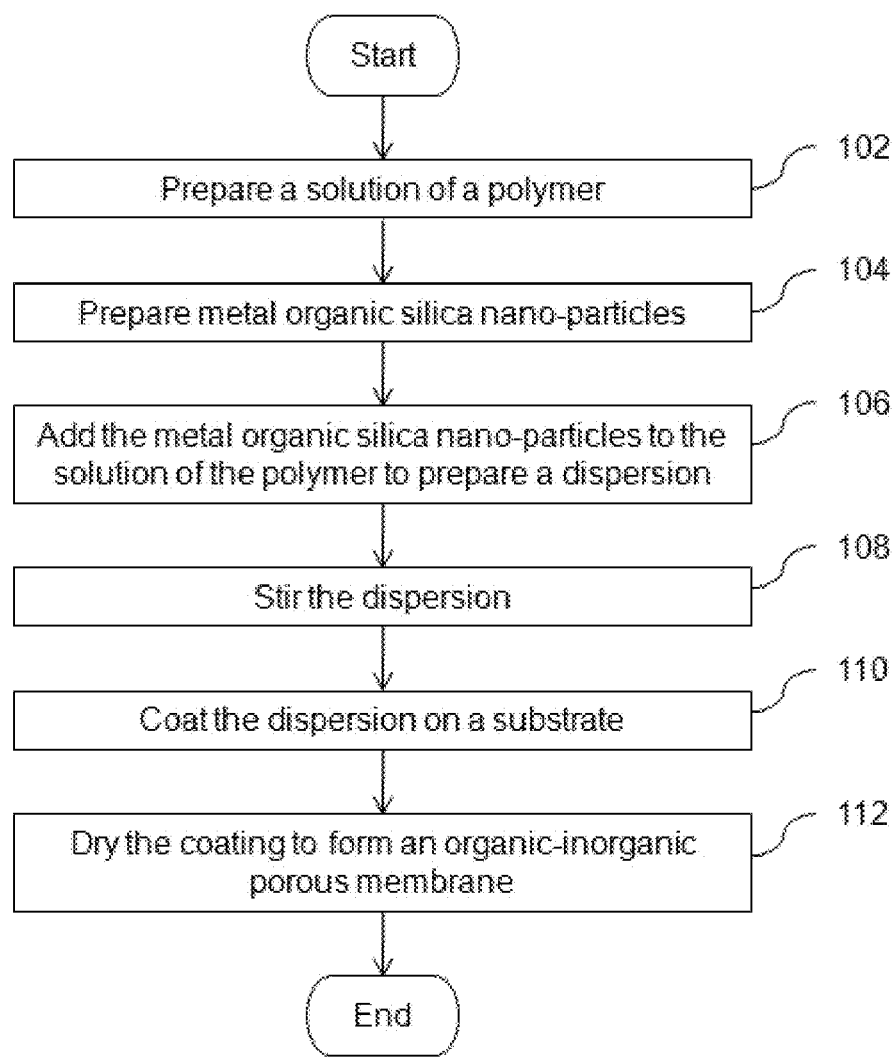
FIG. 1 illustrates a flow diagram of a method for preparing an organic-inorganic porous membrane in accordance with an embodiment of the invention.

FIG. 1 illustrates a flow diagram of a method for preparing an organic-inorganic porous membrane in accordance with an embodiment of the invention. At step 102, a solution of a polymer is prepared, wherein the property of the polymer is to generate a porous membrane using a phase inversion technique. The polymer is selected from a group including polyvinylidene fluoride hexafluoropropylene (PVDF-HFP), polysulfone, cellulose acetate, polystyrene and polyimide and as such those polymers would be apparent to those ordinarily skilled in the art. In an embodiment, the solution of polymer is prepared by mixing the polymer in a mixture of solvent and non-solvent. The solvent and non solvent are selected based on the polymer which is selected. The solvent and non-solvent are selected such that the selected polymer is soluble in the solvent and insoluble in the non-solvent. The solvent can be one or more of, but not limited to, acetone, toluene, isopropanol, N-methyl-2-pyrrolidinone (NMP), N,N-dimethylformamide (DMF) and ethyl acetate. The non solvent can be one or more of, but not limited to, water, n-butanol, nitromethane, dimethyl sulfoxide.

For example, a solution of the PVDF-HFP copolymer is prepared by mixing the PVDF-HFP copolymer in the mixture of solvent and non-solvent, where the solvent used is acetone and non-solvent used is water.

In another embodiment, the solution of the polymer is prepared by dissolving the polymer in one or more solvent to obtain a polymer solution. Thereafter, the polymer solution is stirred. While the polymer solution is stirred, one or more non-solvents is added to the polymer solution such that the weight percentage (wt %) of the one or more non-solvents in the polymer solution is about 5 wt %.

In another embodiment, the solution of the polymer includes about 8 wt % of the polymer, about 87.4 wt % of the one or more solvents and about 4.6 wt % of the one or more non-solvents.

At step 104, metal organic silica nano-particles are prepared. The method of preparing the metal organic silica nano-particles includes modifying surface of silica with an organic linker. The silica is selected from a group that includes silica nano-particles, mesoporous silica and silica gel. The surface of the silica can be modified with an ethylenediamine functional group using one or more of, but not limited to, N-[3-(Trimethoxysilyl) propyl]ethylenediamine (PEDA), polyethylenimine, other silane coupling agents and as such those agents which would be apparent to those skilled in the art. After modifying the surface of silica, the silica is treated with a solution of one or more metal ions such as, but not limited to, copper ions ($Cu^{2+}$), silver ions ($Ag^+$), nickel ions ($Ni^{2+}$), zinc ions ($Zn^{2+}$), palladium ions ($Pd^{2+}$), manganese ions ($Mn^{2+}$) and ferrous ions ($Fe^{2+}$). After treating the surface of silica with the solution of the one or more metal ions, a metal ion organic silica complex is formed. The metal ion of the metal ion organic silica complex is reduced to obtain metal nanoparticles. The metal group of the metal organic silica nano-particles includes metal nanoparticles such as, but not limited to, copper (Cu), silver (Ag), zinc (Zn), palladium (Pd), manganese (Mn) and iron (Fe) nano-particles. The metal nanoparticles. Alternatively, the metal group can be a combination of bimetal that includes a combination of two metal nano-particles. The metal nano-particles are formed on the surface of the silica as a powder.

The metal organic silica nano-particles include one or more of, but not limited to, metal diamine silica nano-particles and metal branched-amine silica nano-particles.

At step 106, the metal organic silica nano-particles are added to the solution of the polymer to prepare dispersion. In an embodiment, the metal organic silica nano-particles is added to the solution of polymer such as the weight ratio of the metal organic silica nano-particles to the solution of the polymer in the dispersion is about 1:4. In another embodiment, the metal organic silica nano-particles is added to the solution of polymer such as the weight ratio of the metal organic silica nano-particles to the solution of the polymer in the dispersion is about 3:4.

Thereafter, at step 108, the dispersion is stirred. The dispersion can be stirred using mechanical mixing devices such as, but not limited to, magnetic stirrer, vibrating plates and motor-driven stirring blades. The dispersion can be stirred for a period of 15 minutes. The stirring step is important as stirring ensures uniform dispersion of the metal organic silica particles in the solution of the polymer.

Thereafter, at step 110, the dispersion is coated on a substrate such as, but not limited to, a glass substrate and fabric. The dispersion is coated on the substrate by manual dip coating. Alternatively, a dip coating machine is used to coat the dispersion on the substrate. Any other coating techniques which are apparent to person skilled in the art can be used to coat the dispersion on the substrate.

Finally, at step 112, the coating is allowed to dry for forming the organic-inorganic porous membrane. The solvent evaporates when the coating is allowed to dry. Further, the polymer undergoes phase inversion in non-solvent to form the porous membrane impregnated with the metal organic silica nano-particles. Generally, the solvent evaporates much before the non-solvent. Further, there is an instantaneous occurrence of mutual diffusion between the solvent and the non-solvent during the evaporation, due to which a highly porous structure is created in a polymer matrix of the organic-inorganic porous membrane.

Figure 2:
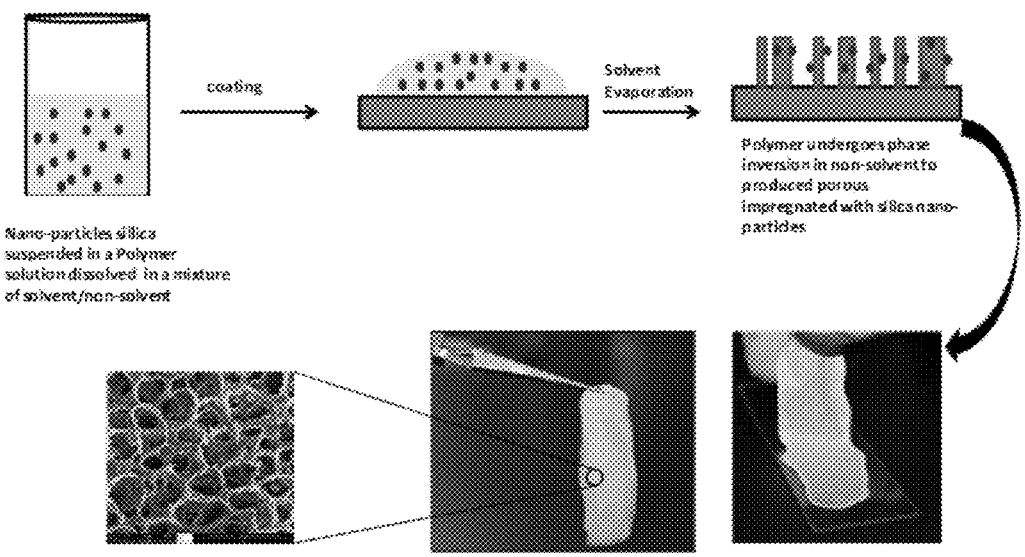
FIG. 2 illustrates a scheme of method steps for preparing an organic-inorganic porous membrane in accordance with an embodiment of the invention.

FIG. 2 illustrates a scheme of method steps for preparing an organic-inorganic porous membrane in accordance with an embodiment of the invention.

In various embodiments of the invention, an organic inorganic porous membrane is prepared using a method that includes preparing a solution of a polymer. The polymer comprises a property of generating a porous membrane using a phase inversion technique. The method includes preparing metal organic silica nano-particles. Further, the metal organic silica nano-particles are added to the solution of the polymer to prepare dispersion. The dispersion is stirred using mechanical mixing devices such as, but not limited to, magnetic stirrer, vibrating plates and motor-driven stirring blades. The method includes coating the dispersion on a substrate. Thereafter, the coating on the substrate is allowed to dry to form the organic-inorganic porous membrane.

Figure 3:
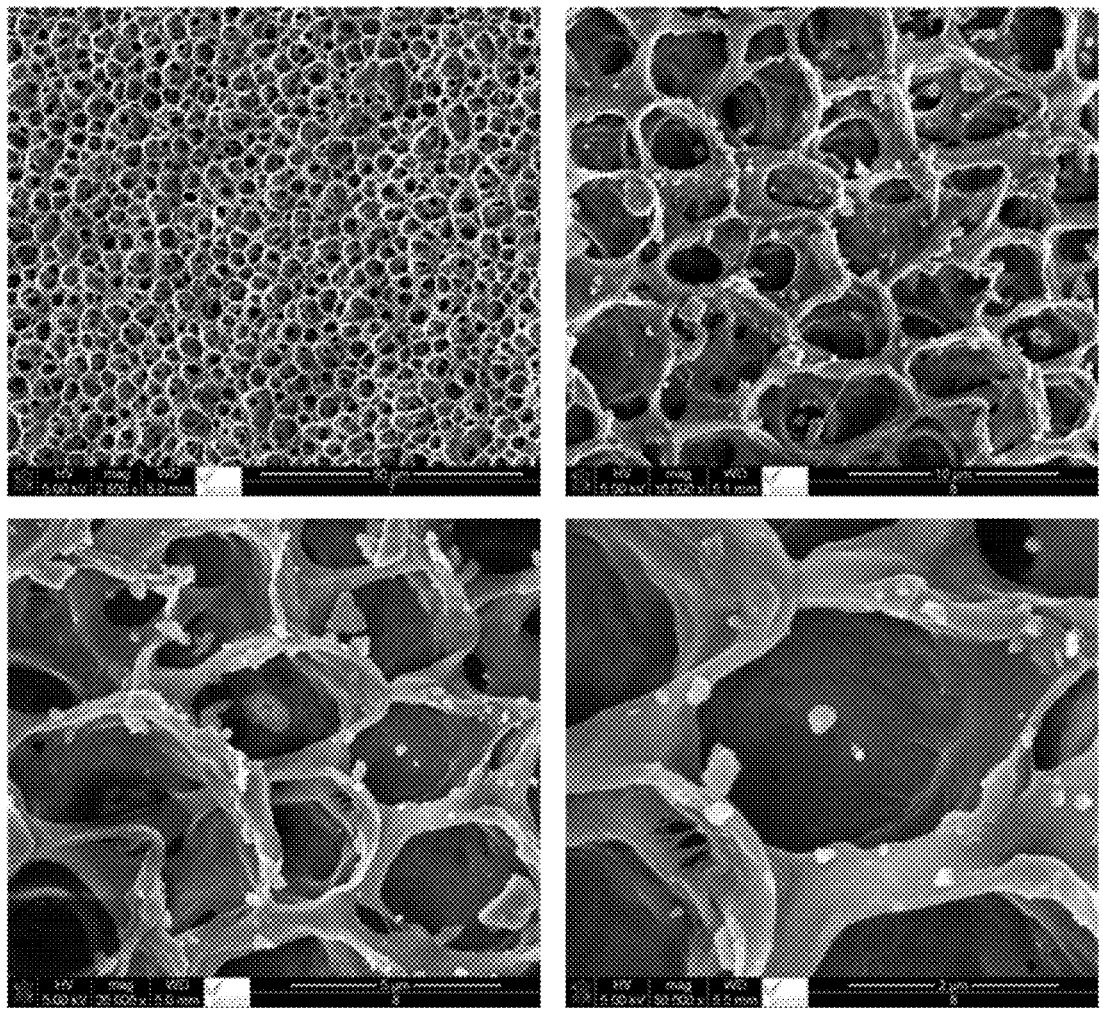
FIG. 3 illustrates a Brunauer-Emmett-Teller (BET) plot showing quantity of gas adsorbed on silica, silica impregnated in polyvinylidene fluoride (PVDF) polymer and PVDF at different relative pressure.

In various embodiments of the invention, the organic-inorganic porous membrane includes metal organic silica nano-particles impregnated in a polymer, wherein the polymer comprises a property of generating porous membrane using a phase inversion technique. The organic-inorganic porous membrane is prepared using the metal organic silica nano-particles and a solution of the polymer. The metal organic silica nano-particles include one or more of, but not limited to, metal diamine silica nano-particles and metal branched-amine silica nano-particles. The metal group in the metal organic silica nano-particles is metal nano-particles. Alternatively, the metal group in the metal organic silica nano-particles is a combination of bimetal. The metal nano-particles are selected from a group that includes copper (Cu), silver (Ag), zinc (Zn), palladium (Pd), manganese (Mn) and iron (Fe) nano-particles. The combination of bimetal is selected combination of two metal nano-particles. The organic linker in the metal organic silica nano-particles can be ethylenediamine functional group. The silica in the metal organic silica nano-particles is selected from a group that includes silica nanoparticles, mesoporous silica and silica gel. The solution of the polymer includes polymers such as, but not limited to, polyvinylidene fluoride hexafluoropropylene (PVDF-HFP), polysulfone, cellulose acetate, polystyrene and polyimide. FIG. 3 illustrates Scanning Electron Microscope (SEM) images of an organic-inorganic porous membrane prepared using polyvinylidene fluoride polymer and metal organic silica nano-particles.

Figure 4:
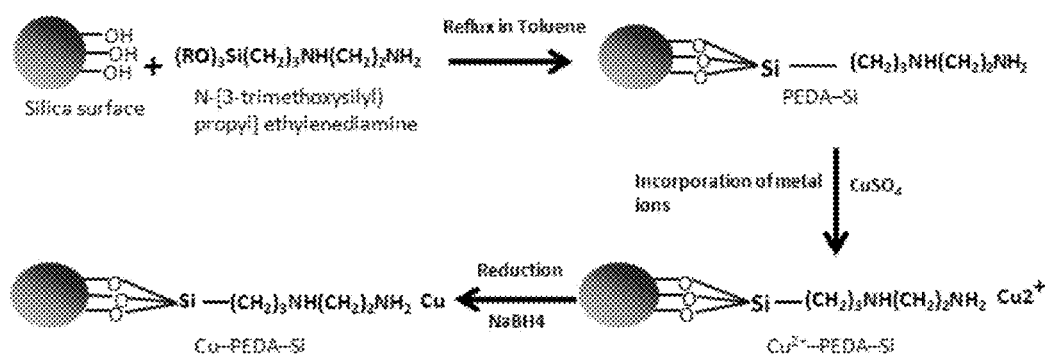
FIG. 4 illustrates Fourier Transform Infrared Spectroscopy (FTIR) for a porous polyvinylidene fluoride (PVDF) film and a porous PVDF film impregnated with metal organic silica nano-particles.

Working Example:

Preparation of PVDF-HFP copolymer porous membrane impregnated with copper propyl ethylenediamine (PEDA) silica nano particles:

FIG. 4 illustrates a complete reaction for preparing PVDF-HFP copolymer porous membrane impregnated with copper PEDA silica nano particles. A solution of 8 wt % of PVDF-HFP copolymer in a mixture of acetone and water is prepared. Acetone is a solvent for the PVDF-HFP and is readily volatile. Water is a non-solvent for the PVDF-HFP and less volatile than the acetone. First, the PVDF-HFP powder is added to acetone and stirred till a clear copolymer solution is obtained. Thereafter, water is added to the clear copolymer solution while stirring. The water was added to the clear copolymer solution in a controllable manner so that water is about 5 wt % of the solution of PVDF-HFP copolymer. The water is added to the clear copolymer solution for increasing the viscosity of the solution of PVDF-HFP copolymer. If amount of water exceeds 5 wt %, then the copolymer might begin to precipitate.

The copper PEDA silica (Cu-PEDA-Si) nano particles is prepared using a silane coupling agent N-[3-trimethoxysilyl) propyl]ethylenediamine, silica gel which has a surface area of 60 square meter per gram (m2/g) and 1.0 Molar (M) copper sulfate (CuSO4) solution. First, 200 milliliter (ml) of dry toluene is transferred into a 500 ml flask which is fitted with a condenser. 5 grams (g) of the silica gel is dispersed in the 200 ml of toluene to prepare a mixture. Before dispersing the silica gel in the toluene, the silica gel is pre-treated with 10 percent (%) of hydrochloric acid (HCl), washed with de-ionized water and dried in an oven at a temperature of 120 degree Celsius (° C.) for a period of 6 hours. The mixture is agitated and heated to 90° C., whilst maintaining the stirring. Thereafter, 4 ml of PEDA is slowly added to the 500 ml flask when the temperature is stabilized. The reaction is carried out under nitrogen atmosphere for 6 hours then allowing the mixture to come down to room temperature. The diamine or branched-amine modified silica (PEDA-Si) are formed in the 500 ml flask which is white in color. The PEDA-Si is separated by centrifuging. After centrifuging, the PEDA-Si is rinsed thoroughly with toluene. Thereafter, the PEDA-Si is dried overnight under vacuum.

Optionally, polyethylenimine can also be used instead of PEDA. When polyethylenimine is used, the volume of toluene is 100 ml and the mixture is heated to 60° C.

300 milligrams (mg) of PEDA-Si is transferred into 10 ml reaction flask. 5 ml of 1.0 M CuSO4 solution is added. The mixture of the PEDA-S and CuSO4 solution is agitated for 1 hour. Excess of copper ion solution is removed by washing the mixture with de-ionized water several times until the washed layer becomes colorless. The change in the color of the mixture to blue color is evidence to incorporation of copper ions and formation of $Cu^{2+}$-PEDA-Si. Thereafter, 150 mg of $Cu^{2+}$-PEDA-Si is transferred to a reaction vial and the reaction vial is kept in an oven at a temperature of 80° C. overnight. Thereafter, 5 ml of freshly prepared 1.0 M Sodium borohydride (NaBH4) which is dissolved in de-ionised water is slowly added to the reaction vial. The reaction vial is agitated for 5 minutes until a metal dark color is observed. The product Cu-PEDA-Si nano particles are formed.

The Cu-PEDA-Si nano particles are added to the solution of PVDF-HFP copolymer such that the weight ratio of the Cu-PEDA-Si nano particles to the solution of PVDF-HFP copolymer is 1:4. The mixture of Cu-PEDA-Si nano particles and the solution of PVDF-HFP copolymer is stirred in a magnetic stirrer for 15 minutes. Thereafter, few drops of the mixture is transferred on the top of a glass slide and the mixture is allowed to dry. Since acetone is much more volatile than water, acetone begins to evaporate first. The evaporation of the acetone leads to an instantaneous occurrence of mutual diffusion between acetone and water. Thus, a highly porous structure is created in the polymer matrix to form the PVDF-HFP copolymer porous membrane impregnated with Cu-PEDA-Si nano particles.

Figure 5:
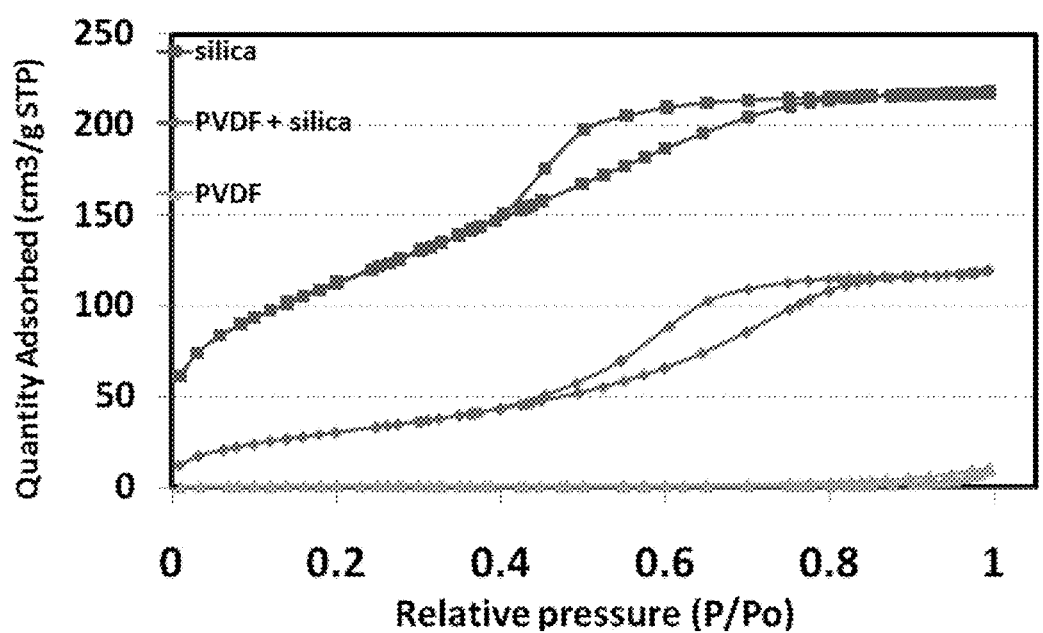
FIG. 5 illustrates Thermo Gravimetric Analysis (TGA) for a porous polyvinylidene fluoride (PVDF) film impregnated with metal organic silica nano-particles.
Figure 6:
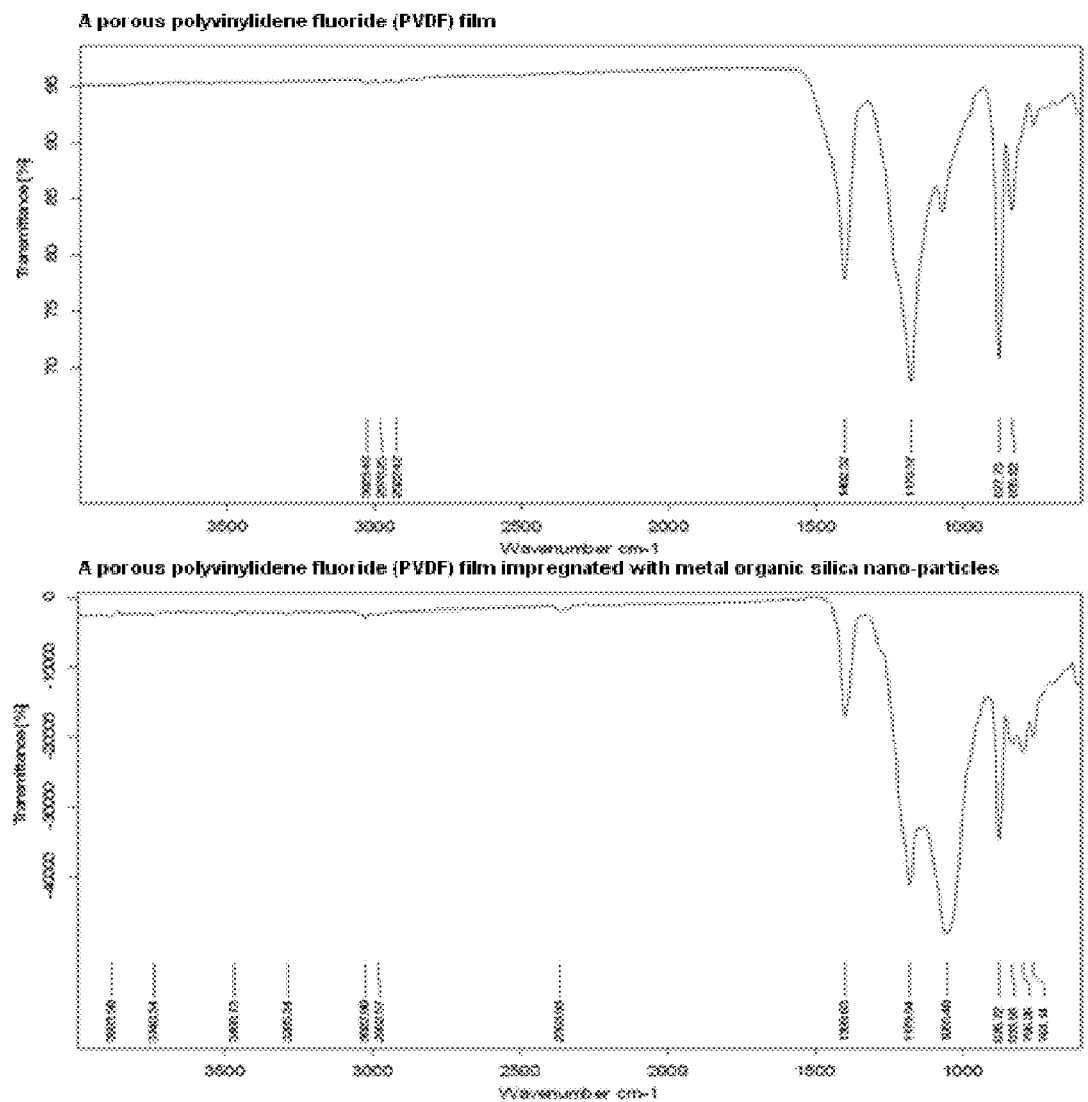
FIG. 6 illustrates Scanning Electron Microscope (SEM) images of an organic-inorganic porous membrane prepared using polyvinylidene fluoride polymer and metal organic silica nano-particles.
Figure 7:
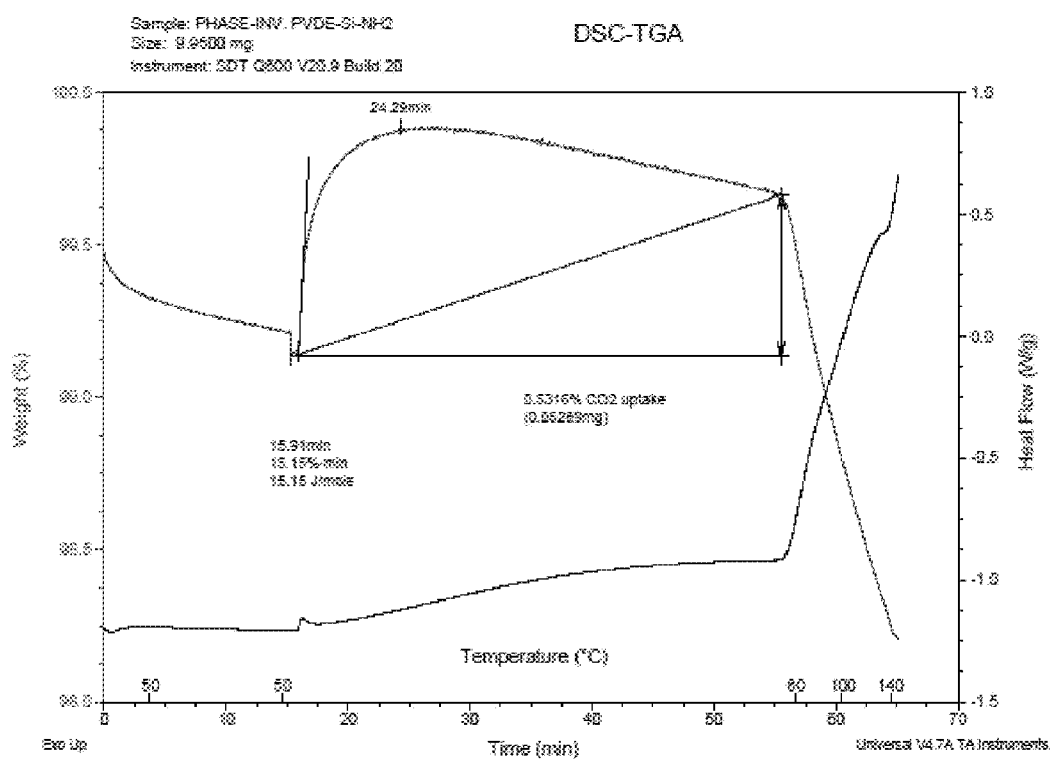
FIG. 7 illustrates a complete reaction for preparing PVDF-HFP copolymer porous membrane impregnated with copper PEDA silica nano particles.

Various embodiments of the invention produce an organic-inorganic porous membrane with significantly improved properties. The organic-inorganic porous membrane includes high selectivity and high permeability properties for gas separation and water purification. FIG. 5 illustrates a Brunauer-Emmett-Teller (BET) plot showing quantity of gas adsorbed on silica, silica impregnated in polyvinylidene fluoride (PVDF) polymer and PVDF at different relative pressure. FIG. 6 illustrates Fourier Transform Infrared Spectroscopy (FTIR) for a porous polyvinylidene fluoride (PVDF) film and a porous PVDF film impregnated with metal organic silica nano-particles. FIG. 7 illustrates Thermo Gravimetric Analysis (TGA) for a porous polyvinylidene fluoride (PVDF) film impregnated with metal organic silica nano-particles. Further, a phase inversion technique is used to prepare the organic-inorganic porous membrane which makes the process cost effective as the phase inversion technique can be easily scaled up. In addition, various embodiments of the invention produce the organic-inorganic porous membrane in different forms. For example, the organic-inorganic membrane can be casted into moulds of required shapes. The organic membrane can also be produced as a free standing film.

Various embodiments of the invention provide an organic-inorganic porous membrane which can be used for capturing one or more of, but not limited to, carbon dioxide (CO2), nitrogen oxides (NOx), methane, hydrogen sulfide (H2S), nitrogen (N2), hydrogen (H2) and sulfur dioxides (SO2). The organic-inorganic porous membrane can be coated and impeded inside a fabric as a film. Air cleaning fabric can be fabricated by impregnating the fabric with organic inorganic porous membrane to remove gases such as CO2. The air cleaning fabric with the organic-inorganic porous membrane can be used to make suits for fire brigade members to protect them from suffocating during firefighting. The organic-inorganic porous membrane can be used for air purification. The air purification can be for removing global warming gases, acid rain gases, toxic gases and other gases which adversely affect human and plants. The organic-inorganic porous membrane can also be used in oil industries to remove impurities from flare gases. The impurities in the flare gases can include, but are not limited to, H2S, SO2, CO2 and N2. Further, organic-inorganic porous membrane can also be used to enrich oxygen (O2) in gas mixture of O2/N2 by removing N2. In air refineries, the organic inorganic porous membrane can be used to recover H2 gas from a hydrogen/hydrocarbon mixture. Different industries such as, but not limited to, oil and gas industry, refinery, petroleum and hydrocarbon processing, chemical processing and pollution abatement can use the organic-inorganic porous membrane for various gas separation applications. Additionally, the various embodiments of the invention provide an organic-inorganic porous membrane which can also be used for water purification.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An organic-inorganic porous membrane comprising metal organic silica nano-particles impregnated in a polymer, wherein the polymer comprises a property of generating porous membrane using a phase inversion technique.

2. The organic-inorganic porous membrane of claim 1, wherein the metal organic silica nano-particles comprises at least one of diamine silica nano-particles and branched amine silica nano-particles.

3. The organic-inorganic porous membrane of claim 1, wherein metal group in the metal organic silica nano-particles is selected from a group comprising metal nano-particles and a combination of bimetal.

4. The organic-inorganic porous membrane of claim 3, wherein the metal nano-particles are selected from a group comprising copper (Cu), silver (Ag), zinc (Zn), palladium (Pd), manganese (Mn) and iron (Fe) nano-particles.

5. The organic-inorganic porous membrane of claim 3, wherein the combination of bimetal is a combination of two metal nano-particles.

6. The organic-inorganic porous membrane of claim 1, wherein an organic linker in the metal organic silica nano-particles is an ethylenediamine functional group.

7. The organic-inorganic porous membrane of claim 1, wherein silica in the metal organic silica nano-particles is selected from a group comprising silica nanoparticles, mesoporous silica and silica gel.

8. The organic-inorganic porous membrane of claim 1, wherein the polymer is selected from a group comprising polyvinylidene fluoride hexafluoropropylene (PVDF-HFP), polysulfone, cellulose acetate, polystyrene and polyimide.

9. A method for preparing an organic-inorganic porous membrane, the method comprising:
preparing a solution of a polymer, wherein the polymer comprises a property of generating a porous membrane using a phase inversion technique;
preparing metal organic silica nano-particles;
adding the metal organic silica nano-particles to the solution of the polymer to prepare a dispersion;
stirring the dispersion;
coating the dispersion on a substrate; and
drying the coating to form the organic-inorganic porous membrane.

10. The method of claim 9, wherein the polymer is selected from a group comprising polyvinylidene fluoride hexafluoropropylene (PVDF-HFP), polysulfone, cellulose acetate, polystyrene and polyimide.

11. The method of claim 9, wherein the preparation of the solution of the polymer comprises mixing the polymer in a mixture of at least one solvent and at least one non-solvent.

12. The method of claim 9, wherein the preparation of the solution of the polymer comprises:
dissolving the polymer in at least one solvent to obtain a polymer solution;
stirring the polymer solution; and
adding at least one non-solvent to the polymer solution till the weight percent (wt %) of the at least one non-solvent in the polymer solution is about 5 wt %.

13. The method of claim 9, wherein the solution of the polymer comprises about 8 wt % of the polymer, about 87.4 wt % of the at least one solvent and about 4.6 wt % of the at least one non-solvent.

14. The method of claim 9, wherein the preparation of the metal organic silica nano-particles comprises:
modifying surface of silica with an organic linker;
treating the silica with a solution of at least one metal ions in response to modifying the surface of the silica to obtain a metal ion organic silica complex; and
reducing the metal ion organic silica complex to form the metal organic silica nano-particles.

15. The method of claim 14, wherein metal group in the metal organic silica nano-particles is selected from a group comprising metal nano-particles and a combination of bimetal.

16. The method of claim 15, wherein the metal nano-particles are selected from a group comprising copper (Cu), silver (Ag), zinc (Zn), palladium (Pd), manganese (Mn) and iron (Fe) nano-particles.

17. The method of claim 15, wherein the combination of bimetal is a combination of two metal nano-particles.

18. The method of claim 14, wherein the silica is selected from at least one of silica nanoparticles, mesoporous silica and silica gel.

19. The method of claim 14, wherein the surface of the silica is modified with ethylenediamine functional group by using at least one of N-[3-(Trimethoxysilyl) propyl]ethylenediamine (PEDA), polyethylenimine and silane coupling agents.

20. The method of claim 14, wherein the metal ion is selected from a group comprising copper ions ($Cu^{2+}$), silver ions ($Ag^+$), nickel ions ($Ni^{2+}$), zinc ions ($Zn^{2+}$), palladium ions ($Pd^{2+}$), manganese ions ($Mn^{2+}$) and ferrous ions ($Fe^{2+}$).

21. The method of claim 9, wherein the metal organic silica nano-particles comprises at least one of diamine silica nano-particles and branched amine silica nano-particles.

22. The method of claim 9, wherein a weight ratio of the metal organic silica nano-particles to the solution of the polymer in the dispersion is about 1:4.

23. The method of claim 9, wherein a weight ratio of the metal organic silica nano-particles to the solution of the polymer in the dispersion is about 3:4.

24. An organic-inorganic porous membrane prepared using a method comprising:
preparing a solution of a polymer, wherein the polymer comprises a property of generating a porous membrane using a phase inversion technique;
preparing metal organic silica nano-particles;
adding the metal organic silica nano-particles to the solution of the polymer to prepare a dispersion;
stirring the dispersion;
coating the dispersion on a substrate; and
drying the coating to form the organic-inorganic porous membrane.

* * * * *